US011970365B2

(12) United States Patent
Pfeiler et al.

(10) Patent No.: US 11,970,365 B2
(45) Date of Patent: Apr. 30, 2024

(54) PROTECTIVE DEVICE DURING ASSEMBLY WORK ON AN ESCALATOR OR A MOVING WALKWAY

(71) Applicant: INVENTIO AG, Hergiswil (CH)

(72) Inventors: Alexander Pfeiler, Vienna (AT); Georg Wagenleitner, Roßleithen (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 17/802,424

(22) PCT Filed: Feb. 26, 2021

(86) PCT No.: PCT/EP2021/054784

§ 371 (c)(1),
(2) Date: Aug. 25, 2022

(87) PCT Pub. No.: WO2021/175708

PCT Pub. Date: Sep. 10, 2021

(65) Prior Publication Data

US 2023/0084071 A1 Mar. 16, 2023

(30) Foreign Application Priority Data

Mar. 4, 2020 (EP) .................................... 20160964

(51) Int. Cl.
*B66B 31/00* (2006.01)
*B66B 29/00* (2006.01)

(52) U.S. Cl.
CPC .............. *B66B 31/00* (2013.01); *B66B 29/00* (2013.01)

(58) Field of Classification Search
CPC ................................ B66B 31/00; B66B 29/00
See application file for complete search history.

(56) References Cited

U.S. PATENT DOCUMENTS

| | | | | |
|---|---|---|---|---|
| 5,458,220 A * | 10/1995 | Nguyen | .................. B66B 23/22 198/335 |
| 6,434,905 B1 * | 8/2002 | Sprague | .................... E06B 3/02 49/501 |
| 9,193,569 B2 | 11/2015 | Shimizu | |
| 2010/0307082 A1 * | 12/2010 | Nash | .................. E04F 11/1851 52/584.1 |
| 2015/0122612 A1 | 5/2015 | Shimizu | |

FOREIGN PATENT DOCUMENTS

| | | | |
|---|---|---|---|
| EP | 1108675 B1 | 12/2012 | |
| JP | 2014141343 A | 8/2014 | |
| JP | 5642209 B2 | 12/2014 | |
| WO | 2019/185573 A1 * | 10/2019 | ............. B66B 31/00 |
| WO | WO 2019185573 A1 | 10/2019 | |

OTHER PUBLICATIONS

International Search Report for International Application No. PCT/EP2021/054784 dated May 14, 2021.

* cited by examiner

*Primary Examiner* — James R Bidwell
(74) *Attorney, Agent, or Firm* — Knobbe, Martens, Olson & Bear, LLP

(57) ABSTRACT

A protective device for protecting assembly personnel during assembly work on a passenger transport system configured as an escalator or moving walkway. The passenger transport system has at least one clamping device for a balustrade panel. A base region of the protective device is configured in such a way that the base region can be held in the clamping device such that it can be clamped in place in lieu of a balustrade panel.

15 Claims, 6 Drawing Sheets

PROTECTIVE DEVICE DURING ASSEMBLY WORK ON AN ESCALATOR OR A MOVING WALKWAY

TECHNICAL FIELD

The disclosure relates to a protective device during assembly work on a passenger transport system configured as an escalator or a moving walkway, to an assembly unit, and to a method for assembling such a passenger transport system.

SUMMARY

Passenger transport systems configured as escalators or as moving walkways are used in buildings in the public sector, for example, in train stations, subway stations, and airports as well as in shopping malls, cultural centers and the like. Escalators or moving walkways have a load-bearing structure which is referred to as a supporting structure. Most of the time, this supporting structure is a framework structure which is manufactured by the manufacturer as a complete unit or divided into supporting structure modules. The supporting structure or the supporting structure modules or framework modules thereof are installed in a building, with the supporting structure connecting two levels of the building, for example. The movable components of the escalator or moving walkway, for example, a step belt or a pallet belt, circulating handrail belts, deflection axles, a drive shaft and parts of the drive motor and transmission and the like, are arranged in this supporting structure. Furthermore, stationary components such as balustrades, comb plates, bearing points, raceways, and guide rails, a controller, monitoring systems, and safety systems and the like are also firmly connected to the supporting structure. Normally, escalators and moving walkways are completely assembled in the DE manufacturing plant and, as a whole or divided into sections by virtue of the supporting structure modules, are transported from the manufacturing plant to the building and used there in the designated support points.

Completely constructed passenger transport systems of the type mentioned above or their sections have a relatively large cross section, which sometimes causes considerable problems when a new escalator or a new moving walkway is to be introduced into an existing building. In order to reduce this cross section for transport from the manufacturing plant to the support points of the building, which are to accommodate the escalator or moving walkway, the balustrades are often not assembled at the manufacturing plant; instead, they are supplied disassembled into their components. In the case of transparent balustrades which have balustrade panels made of glass, this has the additional advantage that they can be transported with significantly better protection than if they were assembled in their exposed position on the supporting structure. In order to be able to firmly connect the components of the balustrades to the supporting structure, there are balustrade clamps permanently mounted on the supporting structure, in which clamps the balustrade components, in particular the balustrade panels made of glass, can be clamped in place.

However, due to the lack of balustrades, the workplace of the assembly personnel must be secured in a particular manner on the supporting structure. For this purpose, WO 2019/185573 A1 proposes a protective device designed as a maintenance railing, which device can be clamped in place on the upper chord of the supporting structure by means of clamping devices formed on the supports. This protective device is very easy to install or remove. However, due to the clamp construction thereof, it is quite expensive and requires a freely accessible upper chord of the supporting structure. This means that, for example, cladding components of a balustrade base arranged between the supporting structure and the balustrade to be assembled may not be assembled. In addition, the profiles used for the upper chords of the supporting structures do not always have the same cross section, so that such a clamping device cannot be used universally. JP 2014141343 A also discloses a corresponding maintenance railing.

Due to the aforementioned problems, the object of the present disclosure can be seen as creating a protective device that can be produced more cost-effectively, can be used in a wide variety of supporting structure constructions, and, if necessary, can be attached to the supporting structure even more easily.

This object is achieved by a protective device for protecting assembly personnel during assembly work on a passenger transport system configured as an escalator, stairway, or moving walkway.

The passenger transport system has at least one clamping device for a balustrade panel, wherein, for this purpose, the balustrade panel comprises a panel clamping region which is configured to match the clamping device in order to be clamped in place by said clamping device. Such a clamping device is disclosed, for example, in US 2015 122612 A1. The protective device comprises at least one barrier device and at least one support. The at least one barrier device and at least one support can be interconnected or can be able to be interconnected. At least during the assembly work, the barrier device extends transversely to the support and in the longitudinal direction of the passenger transport system. The support has a base region having a clamping region at one of the ends thereof, so that the protective device can be attached to the passenger transport system. This clamping region is shaped on the panel clamping region in terms of the design and dimensions thereof and is intended to be held in the at least one clamping device of the passenger transport system such that it can be clamped in place.

In other words, in a passenger transport system in which the balustrades are not mounted, their clamping devices can be used to temporarily accommodate and securely hold the protective device. As a result, existing components of the passenger transport system are used to attach the protective device. This eliminates the need for complex additional parts on the passenger transport system, which are only intended to accommodate a protective device and are then no longer used.

In one embodiment of the protective device, the base region can have a hinge arranged between the support and the clamping region. As a result, the support can be pivoted between a transport position and an assembly position. This embodiment makes it possible for the protective device to be clamped in place in the manufacturing plant with the base regions of the supports in the designated clamping devices. The supports held clamped in place in the balustrade clamps and possibly also the barrier device connected to them are then pivoted into the transport position. In this case, the transport position is that position in which the support extends substantially horizontally and in the transverse direction relative to the longitudinal extension of the passenger transport system.

In other words, the transport position allows the height of the passenger transport system to be kept as low as possible for the transport thereof between the manufacturing plant and the designated support points in the building, despite the protective device already being installed. As soon as the passenger transport system has been inserted into the designated support points of the building, the protective device or the supports thereof can be pivoted into the assembly position. Here, the assembly position is substantially to be understood as a vertical towering of the supports. Or to put it more simply, the protective device leaves the manufacturing plant in a lying position relative to the passenger transport position and can be unfolded and fixed in a standing position on the construction site.

In order to prevent the support from unintentionally folding back from the assembly position back into the transport position, in a further embodiment, the support can have a blocking device. Said blocking device is configured to block a pivoting of the hinge at least in the assembly position.

In a first embodiment of the blocking device, a threaded portion can be formed between the clamping region and the hinge, with a fixing nut being arranged on this threaded portion. This fixing nut can be tightened in a blocking manner against a blocking surface of the hinge or of the support, which blocking surface can be pivoted relative to this threaded portion.

In a second embodiment of the blocking device, a flange with an opening can be arranged on each of the two parts of the hinge, which are interconnected in an articulated manner. These openings are positioned in the flanges in such a way that they are arranged in alignment with one another in the assembly position. There is also a blocking element which can be arranged so as to protrude through the openings in both flanges. In this position, the blocking element can block the hinge. For example, a bolt, a screw, a cotter pin and the like can be used as a blocking element in order to hold the two flanges together and thus block the hinge.

In a third embodiment of the blocking device, a latching mechanism having a spring element and a latching element acted upon by said spring element can be present in the region of the hinge. In the assembly position, the hinge is automatically blocked by the latching mechanism. A latching bolt or a pawl, for example, can be used as the latching element, which blocks the hinge in the assembly position.

In a further embodiment of the protective device, the at least one support can have a receptacle in which the barrier device can be arranged so as to protrude. In other words, the supports can be individually clamped in place in the clamping device along the longitudinal extension of the passenger transport system, and their receptacles can be provided with barrier devices, such that said barrier devices interconnect the supports and thus form a continuous railing.

The barrier device can be a handrail, a bar, a slat, a rope or the like.

In a further embodiment of the disclosure, at least two of the supports can be firmly connected to at least one barrier device and form a rigid railing. However, it must be ensured that the distance of the supports corresponds to the distances of the clamping device. In order to avoid such dependency, all supports of the rigid railing can have a common clamping region.

In a preferred embodiment, the barrier device can be configured so that personal safety equipment can be hooked in thereon to protect the assembly personnel. The barrier device is therefore preferably bar-shaped (round, oval, or provided with strongly rounded edges, rectangular or square cross section), with the safety equipment having a device such as a snap hook, through the eyelet of which the barrier device can protrude. The bar-shaped barrier device for hooking in the personal safety equipment can be provided above or below the hinge. The attachment below the hinge, for example, in a double function as a common clamping region connecting a plurality of supports, has the advantage that, in the event of a possible fall, the forces and bending moments caused by this on the supports are lower than when the personal safety equipment is mounted higher on the supports arranged above the hinge barrier devices. Another equally important advantage of personal safety equipment that can be hooked in under the hinge is that the safety equipment can be used or hooked in even when the protective device is folded in. However, the position of the bar-shaped barrier device can be implemented at any height of the protective device and depends on the embodiment of the clamping device and the supporting structure of the passenger transport system.

The clamping region of the support preferably has two clamping surfaces which are formed parallel to one another, so that the support can be clamped in place sufficiently firmly in the clamping device. Their distance from one another preferably corresponds to a thickness of a balustrade panel or glass panel of the passenger transport system, which panel is intended to be clamped in place in the clamping devices after the protective device has been removed.

As already mentioned, the protective device can be attached to the otherwise finished passenger transport system at the manufacturing plant instead of the balustrade. The passenger transport system and the protective device form an assembly unit, the passenger transport system having at least one clamping device, and at least one clamping region of the protective device being clamped in place in the at least one clamping device of the passenger transport system. The protective device is preferably brought into the transport position in the manufacturing plant; then the assembly unit is loaded and transported to the building at the destination thereof. When the assembly unit has been inserted into the designated support points of the building, the supports of the protective device can be pivoted into the assembly position and secured. The protective device is secured in the assembly position by blocking the hinges.

Escalators and moving walkways are usually designed to be so long that they cannot be transported as a whole on a transport vehicle between the manufacturing plant and the designated building. Such long passenger transport systems are usually divided into sections and transported in this way. Once inside the building, the individual sections are interconnected and inserted into the designated support points in the structure. With regard to the present disclosure, such a section of a passenger transport system can logically also be provided with at least one protective device and thus form an assembly unit. The particular advantage here is that, before the individual sections are assembled to form the entire passenger transport system, the protective device can be moved from the transport position to the assembly position in order to adequately protect the assembly personnel involved in connecting the sections.

The protective device can be used as described below. Such a method for installing a passenger transport system configured as an escalator or moving walkway in the designated support points of the building can substantially have the following method steps.

First, an assembly unit is created in the factory, said assembly unit comprising a passenger transport system or a section of a passenger transport system. Furthermore, the assembly unit also comprises a protective device, said protective device having supports with a hinge.

In a further method step, the at least one protective device is connected to the passenger transport system, with the clamping regions thereof being clamped in place in the clamping devices of the passenger transport system. The at least one protective device is then brought into a transport position before transport from the factory to the building. In other words, the protective device is, as it were, folded over and transported lying on the passenger transport system.

In a further step, the assembly unit is transported to the building and inserted in the designated support points. After insertion, the protective device can be pivoted into the assembly position and secured in this position. Of course, the protective device can also be pivoted into the assembly position before the passenger transport system is inserted.

The method described above can be supplemented by further steps. For example, this can comprise the step of successively replacing the at least one protective device with balustrade panels of the passenger transport system. This is done in that, after releasing at least one of the clamping devices of the passenger transport system, the clamping region of at least one support of the protective device is removed from the clamping device, and at least one balustrade component is clamped in place in the clamping device instead of in the removed clamping region. The assembly personnel should secure themselves at the adjacent protective device (before or after) using their personal safety equipment in order to avoid a possible fall. This ensures a complete safety chain.

The preceding description also points out that, in analogy to the arrangement of balustrade panels, preferably also a plurality of protective devices lined up in a longitudinal direction are clamped in place in the balustrade clamps, rather than only one single, rigid railing per side, which railing extends over the entire length of the passenger transport system. Shorter protective devices that have to be lined up are also much easier to handle and thus further reduce the risk of accidents.

BRIEF DESCRIPTION OF THE DRAWINGS

Embodiments of the disclosure will be described below with reference to the accompanying drawings, with neither the drawings nor the description being intended to be interpreted as limiting the disclosure. Furthermore, the same reference signs are used for elements that are identical or have the same effect. In the drawings.

DETAILED DESCRIPTION

Figure 1:
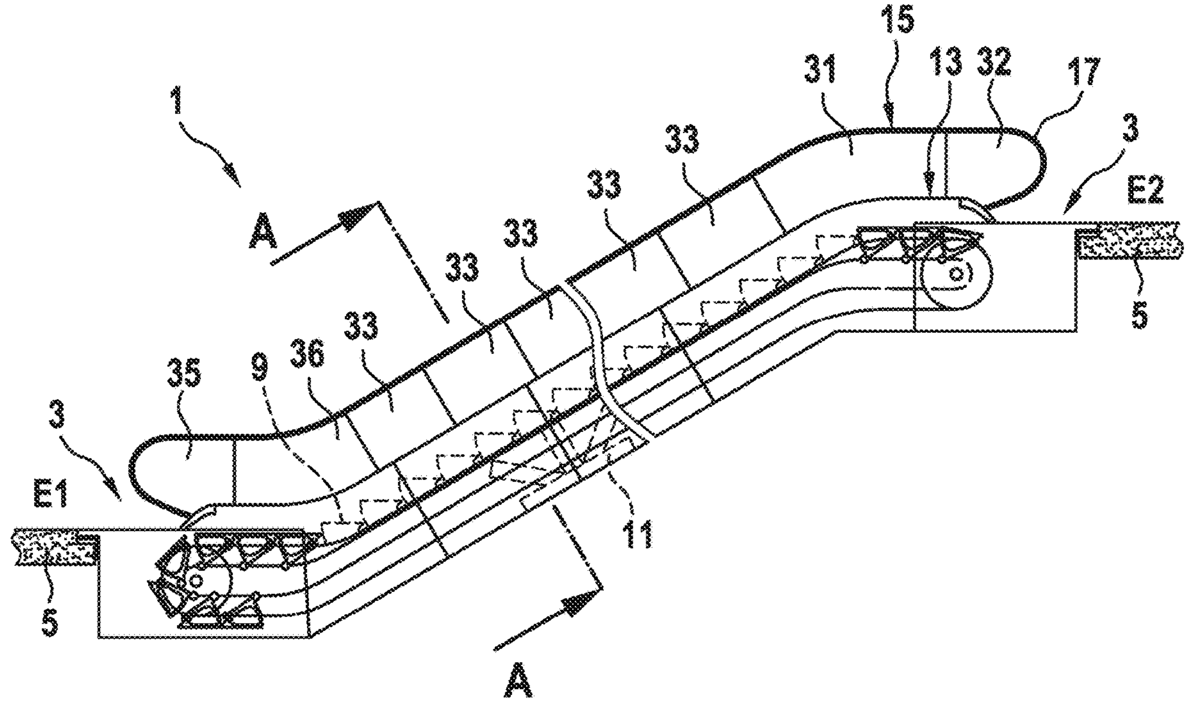
FIG. 1 is a simplified view of an escalator.

FIG. 1 shows a simplified view of a passenger transport system 1 with a supporting structure 11 configured as a framework. The passenger transport system 1 configured as an escalator connects a lower level E1 with an upper level E2 of a building. A circulating step belt 9 is arranged in the supporting structure 11, which step belt is deflected in the upper level E2 and in the lower level E1 and thus has a leading portion and a returning portion. For the sake of clarity, neither the returning portion nor frames, guide rails, rail blocks, and the drive unit are shown. The passenger transport system 1 also has two balustrades 15 which extend along each longitudinal side of the step belt 9, only the balustrade 15 arranged in the foreground in the viewing plane being visible in FIG. 1. A handrail 17 is arranged in circulating manner on each balustrade 15, the returning portion of which is arranged in a balustrade base 13 which connects the balustrade 15 to the supporting structure 11. The balustrade 15 comprises a plurality of (preferably transparent) balustrade panels 31, 32, 33, 35, 36, with the uppermost balustrade panels 31, 32 and the lowermost balustrade panels 35, 36 having specific shapes. The center balustrade panels 33 are substantially rectangular panels.

Figure 2:
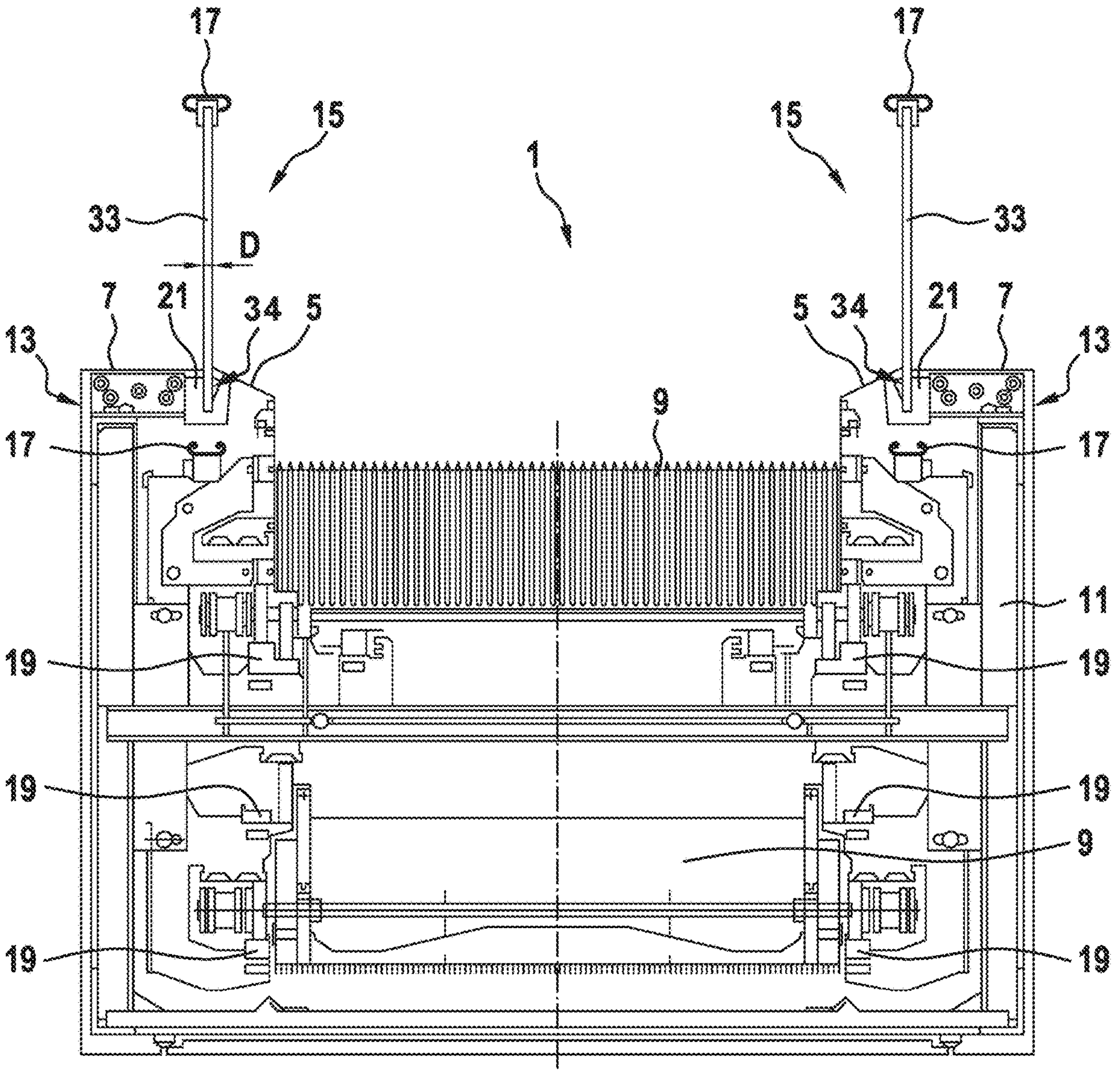
FIG. 2 is a cross section through the escalator according to FIG. 1 along the line A-A.

FIG. 2 shows a cross section through the passenger transport system 1 according to FIG. 1 along the line A-A. In this cross section, both the leading and the returning portion of the step belt 9 can be seen. The step belt 9 is guided on guide rails 19 within the supporting structure 11. A balustrade 15 and a balustrade base 13 are arranged to the left and right of the leading portion of the step belt 9, which portion is arranged at the top when the passenger transport system 1 is installed as intended. Clamping devices 21 are provided within the balustrade base 13, concealed by cladding panels 5, 7, which serve as clamping receptacles for the individual balustrade panels 31, 32, 33, 35, 36 (see also FIG. 1). Here, the balustrade panel 31, 32, 33, 35, 36 is fixedly clamped in at least one of the clamping devices 21 with the panel clamping region 34 thereof configured at the lower end. The clamping devices 21 are arranged along the longitudinal extension within the balustrade base 13 on the supporting structure 11. In addition, the returning portion of the handrail 17 is also guided in the balustrade base 13.

Figure 3:
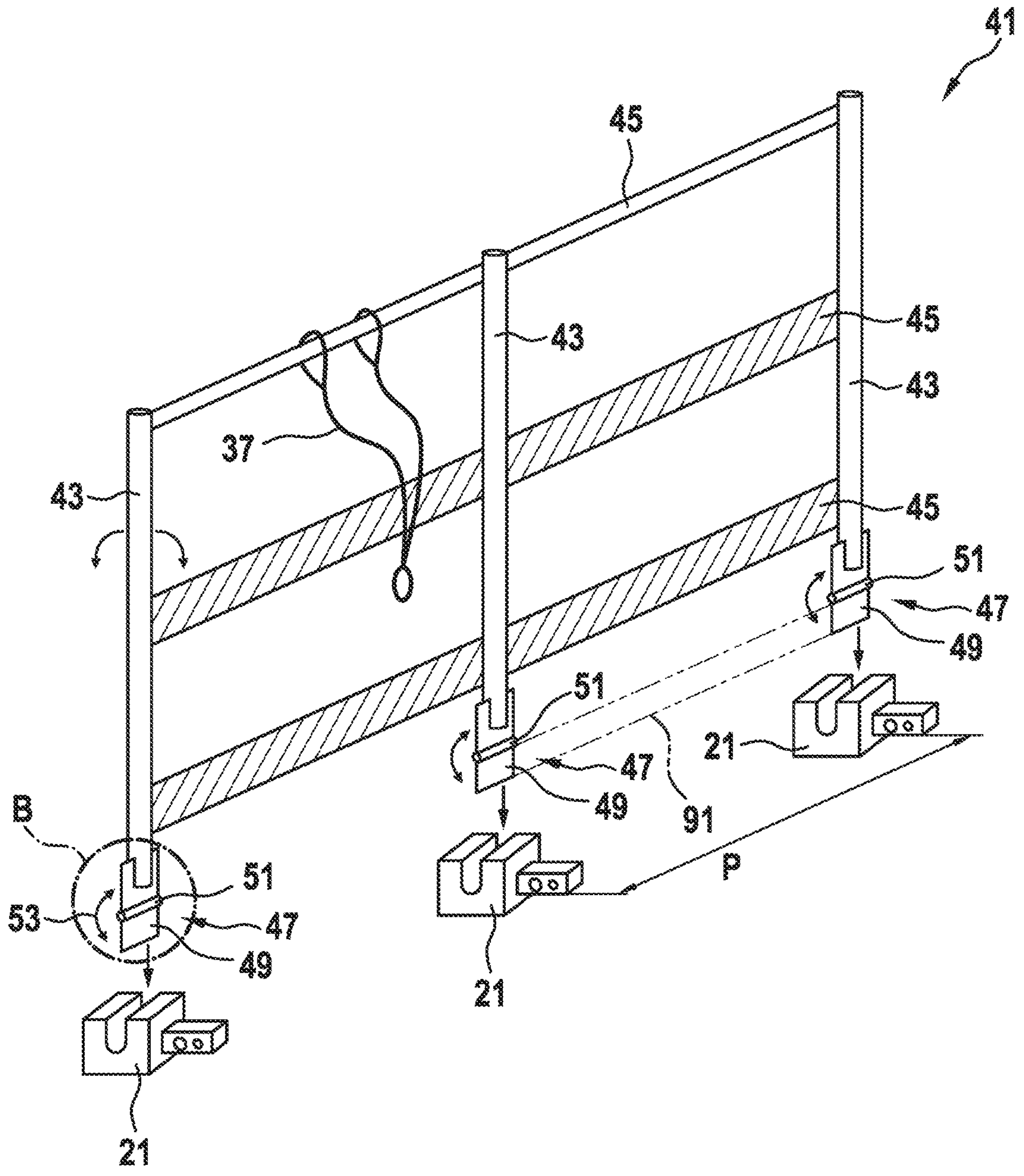
FIG. 3 is a three-dimensional view of a protective device in a first embodiment, which protective device can be clamped in place in clamping devices of the passenger transport system and which has base regions with hinges.

FIG. 3 shows a first embodiment of a protective device 41 in a three-dimensional view, which protective device can be clamped in place in clamping devices 21 of the passenger transport system 1. The protective device 41 has three supports 43 in the present embodiment. The three supports 43 are firmly interconnected with three barrier devices 45 and form a rigid railing. The barrier devices 45 can be designed differently, but substantially have the same properties. The barrier device 45 shuts off the gaps between the supports 43 and thus prevents assembly personnel from falling from the passenger transport system 1 between the supports 43.

A base region 47 is formed at the lower end of the support 43 in each case. In the present embodiment in FIG. 3, the base region 47 comprises a hinge 51 which is arranged between the end of the support 43 and a clamping region 49 formed in the base region 47. The clamping region 49 is that region of the base region 47 which is clamped in place in the clamping device 21. As shown by the double arrows 53, the supports 43 and thus the part of the protective device 41 present above the hinges 51 can be pivoted relative to the clamping devices 21. As described below, the protective device 41 must be secured during assembly work in the position shown, hereinafter referred to as "assembly position," so that it is not unintentionally pivoted while assembly personnel are carrying out assembly work on the passenger transport system 1.

The clamping regions 49 of a plurality of supports 43 can be interconnected, as shown by the double-dotted lines 91, so that generic protective devices 41 do not have to be specially matched to the distances P from clamping devices 21 arranged on the supporting structure 11. A continuous clamping region 49 then also has the additional function of a barrier device.

The barrier device 45 can be a slat, a bar, a tube and the like, which is suitable for interconnecting the supports 43. The barrier device 45 attached to the upper end of the supports 43 is preferably bar-shaped and has a cross section with rounded longitudinal edges. This has the advantage that, for example, personal safety equipment 37 can be hooked in there and easily moved along the barrier device 45.

The bar-shaped barrier device 45 for hooking in the personal safety equipment 37 can be provided above or below the hinge 51. The attachment below the hinge 51, for example, in a double function as a common clamping region 49 connecting a plurality of supports 43, has the advantage that, in the event of a possible fall, the forces and bending moments that occur on the supports 43 are lower than when the personal safety equipment 37 is attached higher up on barrier devices 45 arranged above the hinge 51. A further, equally important advantage of personal safety equipment 37 that can be hooked in below the hinge 51 is that the personal safety equipment 37 can be used or hooked in even when the protective device 41 is folded in (in the transport position). However, the position of the bar-shaped barrier device 45 can be implemented at any height of the protective device 41 and depends on the embodiment of the clamping device 21 and the supporting structure 11 of the passenger transport system 1.

Figure 4:
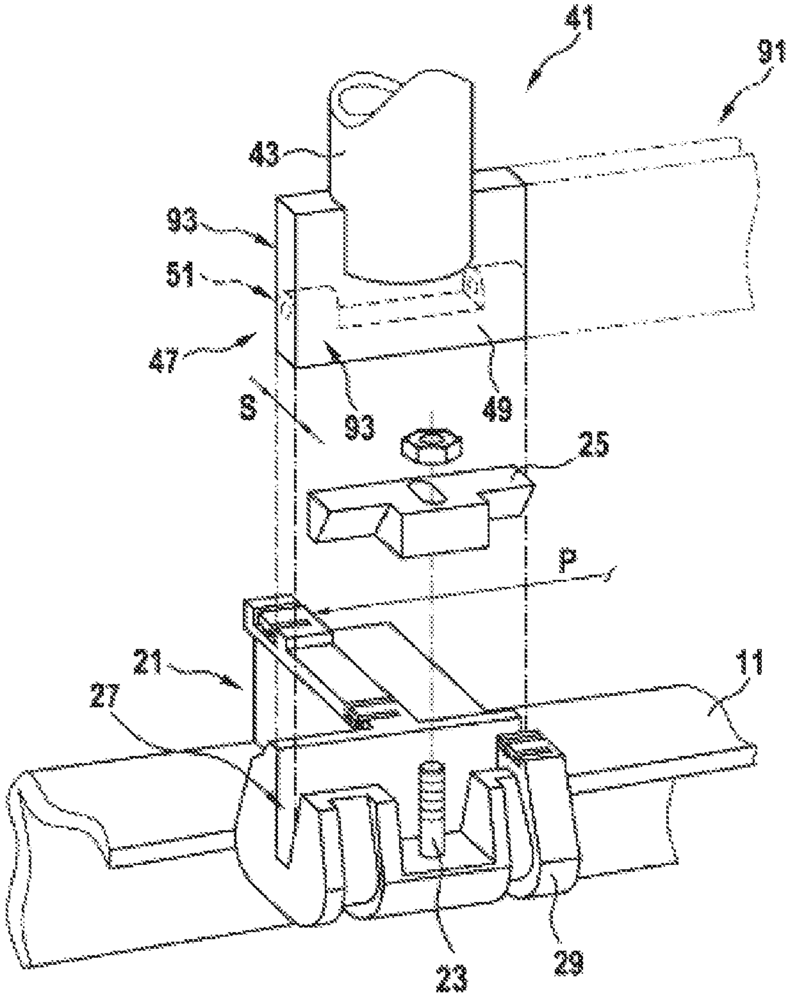
FIG. 4 is a three-dimensional, enlarged view of the detail B shown in FIG. 3, the illustrated base region having no hinge.

FIG. 4 shows a three-dimensional, enlarged view of the detail B indicated in FIG. 3, the base region 47 shown here having no hinge 51. The hinge 51 is only shown here with a broken line as an alternative, in order to show that a hinge could also be used here. Supports 43 with such rigid base regions 47 are preferably used when the protective device 41 is only to be mounted in the building 5 in the clamping devices 21 of the passenger transport system 1, for example, when replacing balustrades 15 or when modernizing the entire passenger transport system 1.

In order to be able to clamp the clamping region 49 in place, the clamping device 21 has a clamping jaw 29 with a wedge groove 27, as well as a wedge element 25 and a clamping element 23. In this case, the clamping region 49 is introduced into the wedge groove 27 and then the wedge element 25 is braced together with the clamping region 49 by means of the clamping element 23 in the wedge groove 27. The clamping region 49 has two clamping surfaces 93 which are parallel to one another, and the thickness distance S of which is matched to the wedge groove 27 and the wedge element 25, so that clamping can also be carried out reliably. Preferably, the thickness distance corresponds to the material thickness of the balustrade panel 31, 32, 33, 35, 36 to be clamped afterwards. If necessary, the clamping region can be supplemented with additional insert plates (not shown) if the thickness distance S is too small.

Figure 5:
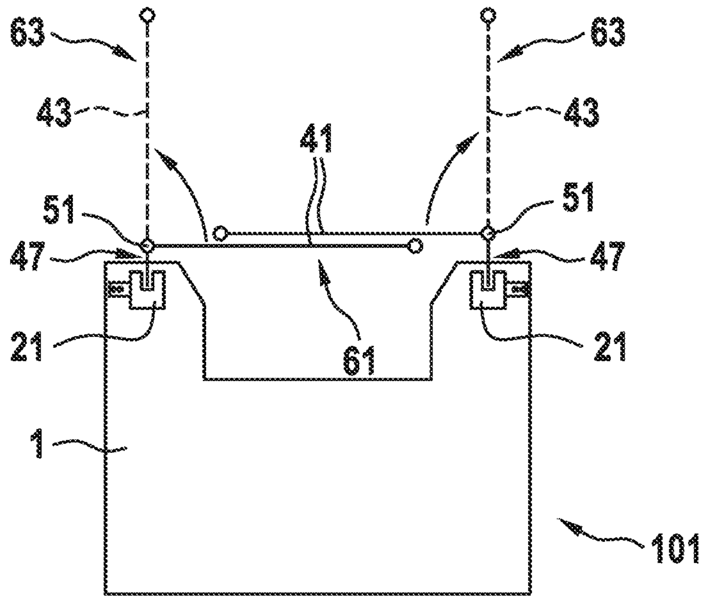
FIG. 5 is, similar to FIG. 2, a cross section through the passenger transport system 1, with protective devices being mounted instead of the balustrades, thereby forming an assembly unit.

FIG. 5 shows a cross section through the passenger transport system 1, similar to that shown in FIG. 2, wherein, instead of the balustrades 15, protective devices 41 are mounted with their base regions 47 in the clamping devices 21 of the passenger transport system 1. As a result, an assembly unit 101 is formed. The protective devices 41 can be arranged horizontally or in a transport position 61 on the upper side of the passenger transport system 1 for the forthcoming transport. As shown by the broken lines, the protective devices 41 can be brought or pivoted into the assembly position 63 due to their hinges 51, with the supports 43 of the protective device 41 extending substantially in the vertical direction in the assembled position 63.

Figure 6:
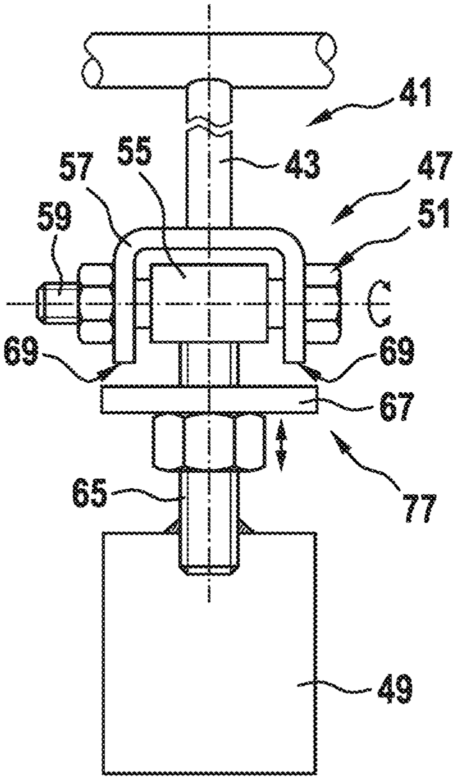
FIG. 6 shows a possible embodiment of the base region of the protective device with a hinge and a fixing nut.
Figure 7:
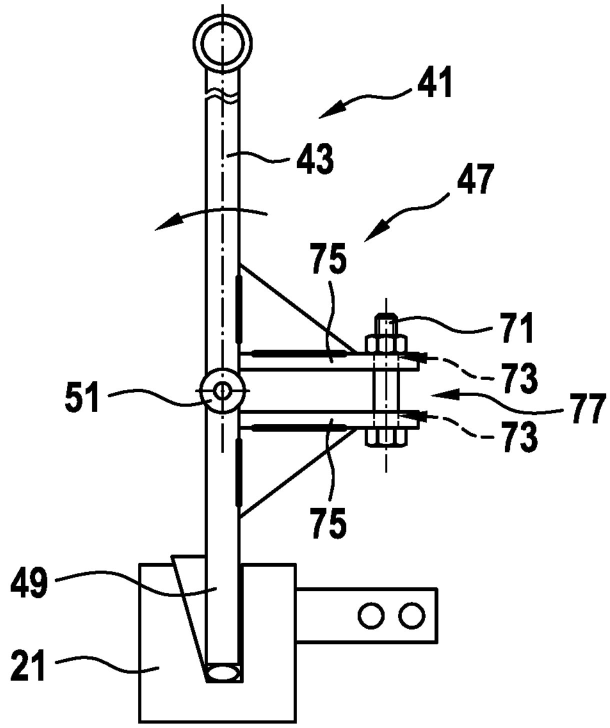
FIG. 7 shows another possible embodiment of the base region of the protective device with a hinge and a blocking element.
Figure 8:
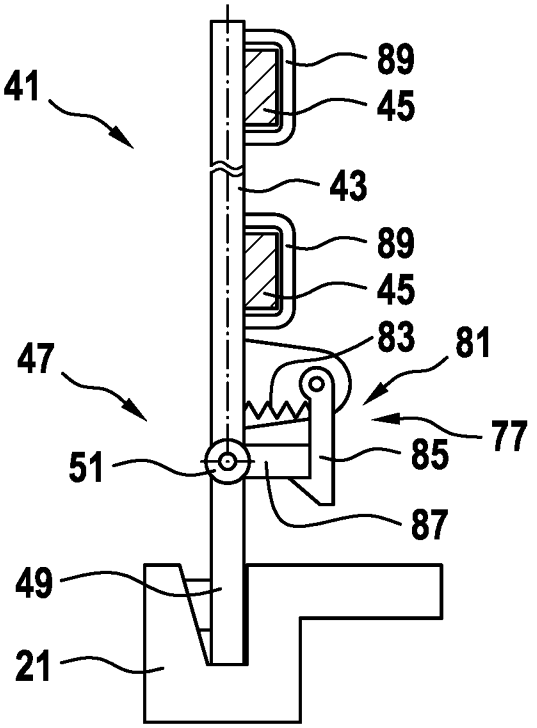
FIG. 8 shows another possible embodiment of the base region of the protective device with a hinge and a latching mechanism.

There are various options for securely blocking the hinge 51, so that the protective device 41 can be secured in the assembly position 63, as is shown in FIGS. 6 to 8 by way of example.

FIG. 6 shows a protective device 41 designed as a rigid railing, in particular the support 43 thereof. A hinge 51 is formed in the base region 47 thereof. The hinge 51 substantially comprises a hinge bearing 55 and a hinge bracket 57, with the hinge bearing 55 being firmly connected to the clamping region 49 and the hinge bracket 57 being firmly connected to the support 43. The hinge bracket 57 is mounted pivotably on the hinge bearing 55 by means of a hinge axis 59. The fixed connection between the hinge bearing 55 and the clamping region 49 is realized by a threaded bolt or a threaded portion 65. A fixing nut 67 is rotatably mounted on this threaded portion 65. In order to block the pivoting of the hinge 51 at least in the assembly position 63, the fixing nut 67 can be braced against the blocking surfaces 69 of the hinge bracket 57, which surfaces can be pivoted relative to the fixing nut 67. The threaded portion 65, the fixing nut 67, and the blocking surfaces 69 thus together form a blocking device 77.

FIG. 7 shows a further possible embodiment of a blocking device 77 having a blocking element 71 which is arranged in the base region 47 of the protective device 41. To block the hinge 51, the blocking element 71 can be inserted into designated openings 73 formed on the support 43 and on the clamping region 49. As a result, the support 43 and the clamping region 49 are rigidly fixed to one another. In the specific embodiment, the support 43 and the clamping region 49 have legs or flanges 75 for this purpose, in which the two openings 73 are formed. A simple screw connection, for example, can serve as the blocking element 71. Of course, ball locking pins, bolts, cotter pins and the like can also be used for this purpose.

FIG. 8 shows another possible embodiment of the base region 47 of the protective device 41 with a latching mechanism 81. In this embodiment, too, the support 43 is connected via a hinge 51 to the clamping region 49 which is clamped in place here in the clamping device 21 shown schematically. The latching mechanism 81 substantially has a spring element 83 and a latching element 85. In the present embodiment of FIG. 8, the latching element 85 is pivotably mounted on the support 43 and is acted upon with a force there by the spring element 83. In the assembly position shown, the latching element 85 is latched with a latching edge 87. Said latching edge 87 is formed in the clamping region 49. The latching mechanism 81 and the latching edge 87 together form the blocking device 77.

Furthermore, FIG. 8 does not show a rigid railing, as in the previous embodiments of FIGS. 6 and 7, which railing is formed from supports 43 and barrier devices 45 that are permanently interconnected, but rather a protective device 41 that can be assembled from these parts. In this case, the support 43 has receptacles 89 which serve as holders for the barrier devices 45. Such a protective device 41 is erected on the passenger transport system 1 as follows. First, supports 43 are clamped in place in the existing clamping devices 21 of the passenger transport system 1. After insertion of the passenger transport system 1 into the designated support points 3 of the building 5, the supports 43 can be pivoted from the transport position 61 into the assembly position 63 and latched. Barrier devices 45 are then pushed through the receptacles 89 so that a barrier device 45 is held by at least two supports 43. If necessary, the barrier device 45 can be secured in the receptacles 89 or on the supports 43 by means of suitable securing elements such as ball locking pins, cotter pins, or screws.

Although FIGS. 1 to 8 show different aspects of the present disclosure on the basis of a passenger transport system 1 configured as an escalator, which is intended to interconnect levels E1, E2 which are vertically spaced apart from one another, it is obvious that the devices and corresponding method steps described also apply to obliquely arranged moving walkways or to moving walkways arranged on a horizontal plane.

Finally, it should be noted that terms such as "comprising," "having," etc., do not preclude other elements or steps and terms such as "a" or "an" do not preclude a plurality. Furthermore, it should be noted that features or steps which have been described with reference to one of the above embodiments may also be used in combination with other features or steps of other embodiments described above. Reference signs in the claims should not be considered to be limiting.

The invention claimed is:

1. A protective device for protecting assembly personnel during assembly work on a passenger transport system configured as an escalator or moving walkway, said passenger transport system having at least one clamping device for a balustrade panel, wherein the balustrade panel comprises a panel clamping region that is configured to match the clamping device in order to be clamped in place by said clamping device, the protective device comprising:

at least one barrier device and at least one support that are interconnected and, at least during assembly work, said barrier device extends transversely to the support and in a longitudinal extension of the passenger transport system, wherein the support has a base region having a clamping region at one end thereof, which clamping region is shaped according to the panel clamping region and is configured to be held in the at least one clamping device of the passenger transport system such that it can be clamped in place.

2. The device of claim 1, wherein the base region has a hinge arranged between the support and the clamping region so that the support can be pivoted between a transport position and an assembly position.

3. The device of claim 2, wherein the support has a blocking device which is configured to block a pivoting of the hinge at least in the assembly position.

4. The device of claim 3, wherein a threaded portion is formed as a blocking device between the clamping region and the hinge, and a fixing nut is arranged on this threaded portion, which fixing nut can be tightened in a blocking manner against a blocking surface of the hinge or of the support, which blocking surface can be pivoted relative to this threaded portion.

5. The device of claim 3, wherein a flange having an opening is arranged as a blocking device on each of two parts of the hinge, which are interconnected in an articulated manner, said openings being arranged in alignment with one another in the assembly position, and also a blocking element being present, which can be arranged in the openings of both flanges so as to protrude therethrough and which blocks the hinge in this position.

6. The device of claim 3, wherein a latching mechanism having a spring element and a latching element acted upon by said spring element is present as the blocking device in the region of the hinge, wherein the hinge is automatically blocked by the latching mechanism in the assembly position.

7. The device of claim 1, wherein the at least one support has a receptacle in which the barrier device can be arranged so as to protrude.

8. The device of claim 7, wherein the barrier device is a handrail, a bar, a slat, or a rope.

9. The device of claim 1, wherein at least two supports are firmly connected to at least one barrier device and form a rigid railing.

10. The device of claim 1, wherein the barrier device is configured so that personal safety equipment can be hooked in thereon to protect the assembly personnel.

11. The device of claim 1, wherein the clamping region has two parallel clamping surfaces, the distance of which from one another corresponds to the thickness of a balustrade panel of the passenger transport system.

12. An assembly unit, comprising a passenger transport system which is configured as an escalator or moving walkway and comprising at least one protective device according to claim 1, wherein the passenger transport system has at least one clamping device, and the clamping regions of the protective device are clamped in place in the at least one clamping device of the passenger transport system.

13. An assembly unit, comprising a section of a passenger transport system which is configured as an escalator or moving walkway and comprising at least one protective device according to claim 1, wherein the passenger transport system has at least one clamping device, and the clamping regions of the protective device are clamped in place in the at least one clamping device of the section of the passenger transport system.

14. A method for installing a passenger transport system configured as an escalator or moving walkway in designated support points in a building, the method comprising:

manufacturing an assembly unit according to claim 12, wherein the at least one protective device has supports having a hinge;

moving the at least one protective device into a transport position before transport from the factory to the building;

transporting the assembly unit to the building and inserting the assembly unit in the designated support points; and that, after insertion of the assembly unit, pivoting the protective device into the assembly position and securing the protective device in this position.

15. The method of claim 14, further comprising:

successively replacing the at least one protective device with balustrade panels of the passenger transport system, in that, after releasing the at least one clamping device of the passenger transport system, the clamping region of at least one support of the protective device is removed from the clamping device; and instead of the removed clamping region, clamping at least one balustrade panel in place in the clamping device.

* * * * *